United States Patent
Vanhoucke et al.

(10) Patent No.: US 10,460,211 B2
(45) Date of Patent: Oct. 29, 2019

(54) IMAGE CLASSIFICATION NEURAL NETWORKS

(71) Applicant: Google LLC, Mountain View, CA (US)

(72) Inventors: Vincent O. Vanhoucke, San Francisco, CA (US); Christian Szegedy, Mountain View, CA (US); Sergey Ioffe, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/395,530

(22) Filed: Dec. 30, 2016

(65) Prior Publication Data

US 2017/0243085 A1    Aug. 24, 2017

Related U.S. Application Data

(60) Provisional application No. 62/297,101, filed on Feb. 18, 2016.

(51) Int. Cl.
| | |
|---|---|
| G06K 9/62 | (2006.01) |
| G06N 3/04 | (2006.01) |
| G06N 3/08 | (2006.01) |
| G06K 9/46 | (2006.01) |
| G06K 9/00 | (2006.01) |

(52) U.S. Cl.
CPC ......... *G06K 9/6267* (2013.01); *G06K 9/4628* (2013.01); *G06N 3/04* (2013.01); *G06N 3/0445* (2013.01); *G06N 3/08* (2013.01); *G06K 9/00979* (2013.01)

(58) Field of Classification Search
None
See application file for complete search history.

(56) References Cited

U.S. PATENT DOCUMENTS

2015/0117760 A1    4/2015    Wang et al.

FOREIGN PATENT DOCUMENTS

WO    2015/078018    6/2015

OTHER PUBLICATIONS

Krizhevsky "ImageNET Classification with Deep Convolutional Neural Networks", NIPS 2012.*

(Continued)

*Primary Examiner* — Mark Roz
(74) *Attorney, Agent, or Firm* — Fish & Richardson P.C.

(57) ABSTRACT

A neural network system that includes: multiple subnetworks that includes: a first subnetwork including multiple first modules, each first module including: a pass-through convolutional layer configured to process the subnetwork input for the first subnetwork to generate a pass-through output; an average pooling stack of neural network layers that collectively processes the subnetwork input for the first subnetwork to generate an average pooling output; a first stack of convolutional neural network layers configured to collectively process the subnetwork input for the first subnetwork to generate a first stack output; a second stack of convolutional neural network layers that are configured to collectively process the subnetwork input for the first subnetwork to generate a second stack output; and a concatenation layer configured to concatenate the pass-through output, the average pooling output, the first stack output, and the second stack output to generate a first module output for the first module.

15 Claims, 7 Drawing Sheets

(56) References Cited

OTHER PUBLICATIONS

Rachmadi, "Vehicle Color Recognition using Convolutional Neural Network", Cornell University Library, 2015.*
Ray, "Scene Text Recognition using Deep Belief Networks", ICVGIP 2014.*
He et al. "Deep Residual Learning for Image Recognition," arXiv preprint arXiv1512.03385v1, Dec. 10, 2015, 12 pages.
International Search Report and Written Opinion in International Application No. PCT/US2016/069279, dated Dec. 29, 2016, 18 pages.
Lin et al. "Network in Network," arXiv preprint arXiv 1312.4400v3, Mar. 4, 2014, 10 pages.
Srinivas et al. "A Taxonomy of Deep Convolutional Neural Nets for Computer Vision," Cornell University Library, 201 Olin Library Cornell University Ithaca, NY 14853, Jan. 25, 2016, 18 pages.
Szegdy et al. "Going Deeper with Convolutions," arXiv preprint arXiv 1409.4842v1 Sep. 17, 2014, 12 pages.
Szegdy et al. "Rethinking the Inception Architecture for Computer Vision," arXiv preprint arXiv 1512.00567v3, Dec. 11, 2015, 10 pages.
International Preliminary Report on Patentability issued in International Application No. PCTUS2016069279, dated May 3, 2018, 21 pages.
AU Office Action in Australian Appln. 2016393639, dated Apr. 9, 2019, 3 pages.

* cited by examiner

IMAGE CLASSIFICATION NEURAL NETWORKS

CROSS-REFERENCE TO RELATED APPLICATION

This application claims priority to U.S. Provisional Application Ser. No. 62/297,101, filed on Feb. 18, 2016. The disclosure of the prior application is considered part of and is incorporated by reference in the disclosure of this application.

BACKGROUND

This specification relates to processing images using deep neural networks, e.g., convolutional neural networks.

Convolutional neural networks generally include at least two kinds of neural network layers, convolutional neural network layers and fully-connected neural network layers. Convolutional neural network layers have sparse connectivity, with each node in a convolutional layer receiving input from only a subset of the nodes in the next lowest neural network layer. Some convolutional neural network layers have nodes that share weights with other nodes in the layer. Nodes in fully-connected layers, however, receive input from each node in the next lowest neural network layer.

SUMMARY

In general, one innovative aspect of the subject matter described in this specification can be embodied in a first neural network system that is configured to receive an image and to generate a classification output for the input image. The first neural network system can be implemented as computer programs on one or more computers in one or more locations. The first neural network system can include: multiple subnetworks arranged in a stack on top of each other, in which each subnetwork is configured to process a subnetwork input to generate a subnetwork output and to provide the subnetwork output as input to another subnetwork above the subnetwork in the stack, and in which the plurality of subnetworks includes: a first subnetwork including multiple first modules, each first module including: a pass-through convolutional layer configured to process the subnetwork input for the first subnetwork to generate a pass-through output; an average pooling stack of neural network layers, in which the layers in the average pooling stack are configured to collectively process the subnetwork input for the first subnetwork to generate an average pooling output; a first stack of convolutional neural network layers, in which the layers in the first stack are configured to collectively process the subnetwork input for the first subnetwork to generate a first stack output; a second stack of convolutional neural network layers, in which the layers in the second stack are configured to collectively process the subnetwork input for the first subnetwork to generate a second stack output; and a concatenation layer configured to concatenate the pass-through output, the average pooling output, the first stack output, and the second stack output to generate a first module output for the first module.

The foregoing and other embodiments can each optionally include one or more of the following features, alone or in combination. The first subnetwork includes four first modules. The pass-through convolutional layer is a 1×1 convolutional layer. The average pooling stack includes an average pooling layer followed by a 1×1 convolutional layer. The first stack includes a 1×1 convolutional layer followed by a 3×3 convolutional layer. The second stack includes a 1×1 convolutional layer followed by a 3×3 convolutional layer followed by a 3×3 convolutional layer. The first subnetwork is configured to combine the first module outputs generated by the plurality of first subnetworks to generate a first subnetwork output for the first subnetwork. The first subnetwork receives an input that is 35×35×384 and each first module generates an output that is 35×35×384.

Another innovative aspect of the subject matter described in this specification can be embodied in a second neural network system that is configured to receive an image and to generate a classification output for the input image. The second neural network system can be implemented by one or more computers and are configured to receive an image and to generate a classification output for the input image. The second neural network system can include: a plurality of subnetworks arranged in a stack on top of each other, in which each subnetwork is configured to process a subnetwork input to generate a subnetwork output and to provide the subnetwork output as input to another subnetwork above the subnetwork in the stack, and in which the plurality of subnetworks includes: a second subnetwork comprising a plurality of second modules, each second module including: a pass-through convolutional layer configured to process the subnetwork input for the second subnetwork to generate a pass-through output; an average pooling stack of neural network layers, in which the layers in the average pooling stack are configured to collectively process the subnetwork input for the second subnetwork to generate an average pooling output; a third stack of convolutional neural network layers, in which the layers in the third stack are configured to collectively process the subnetwork input for the second subnetwork to generate a third stack output; a fourth stack of convolutional neural network layers, in which the layers in the fourth stack are configured to collectively process the subnetwork input for the second subnetwork to generate a fourth stack output; and a concatenation layer configured to concatenate the pass-through output, the average pooling output, the third stack output, and the fourth stack output to generate a second module output for the second module.

The foregoing and other embodiments can each optionally include one or more of the following features, alone or in combination. The second subnetwork can include seven second modules. The pass-through convolutional layer can be a 1×1 convolutional layer. The average pooling stack can include an average pooling layer followed by a 1×1 convolutional layer. The third stack can include a 1×1 convolutional layer followed by a 1×7 convolutional layer followed by a 1×7 convolutional layer. The fourth stack can include a 1×1 convolutional layer followed by a 1×7 convolutional layer followed by a 7×1 convolutional layer followed by a 1×7 convolutional layer followed by a 7×1 convolutional layer. The second subnetwork can be configured to combine the second module outputs generated by the plurality of second modules to generate a second subnetwork output for the second subnetwork. The second subnetwork can receive an input that is 17×17×1024 and each first module generates an output that is 17×17×1024.

Another innovative aspect of the subject matter described in this specification can be embodied in a third neural network system that is implemented by one or more computer and is configured to receive an image and to generate a classification output for the input image. The third neural network system may include: a plurality of subnetworks arranged in a stack on top of each other, wherein each subnetwork is configured to process a subnetwork input to generate a subnetwork output and to provide the subnetwork output as input to another subnetwork above the subnetwork in the stack, and wherein the plurality of subnetworks includes: a third subnetwork comprising a plurality of third modules, each third module comprising: a pass-through convolutional layer configured to process the subnetwork input for the third subnetwork to generate a pass-through output; an average pooling stack of neural network layers, wherein the layers in the average pooling stack are configured to collectively process the subnetwork input for the third subnetwork to generate an average pooling output; a first group of convolutional neural network layers, wherein the layers in the first group are configured to collectively process the subnetwork input for the third subnetwork to generate a first group output; a second group of convolutional neural network layers, wherein the layers in the second group are configured to collectively process the subnetwork input for the third subnetwork to generate a second group output; and a concatenation layer configured to concatenate the pass-through output, the average pooling output, the first group output, and the second group output to generate a third module output for the third module.

The foregoing and other embodiments can each optionally include one or more of the following features, alone or in combination. The second subnetwork includes three second modules. The pass-through convolutional layer can be a 1×1 convolutional layer. The average pooling stack can include an average pooling layer followed by a 1×1 convolutional layer. The first group can include: a 1×1 convolutional layer configured to process the subnetwork input for the third subnetwork to generate a first intermediate output; a 1×3 convolutional layer configured to process the first intermediate output to generate a second intermediate output; a 3×1 convolutional layer configured to process the first intermediate output to generate a third intermediate output; and a first group concatenation layer configured to concatenate the second intermediate output and the third intermediate output to generate the first group output. The second group can include: a fifth stack of convolutional layers that is configured to process the subnetwork input for the third subnetwork to generate a fifth stack output; a 1×3 convolutional layer configured to process the fifth stack output to generate a fourth intermediate output; a 3×1 convolutional layer configured to process the fifth stack output to generate a fifth intermediate output; and a second group concatenation layer configured to concatenate the fourth intermediate output and the fifth intermediate output to generate the second group output. The fifth group can include a 1×1 convolutional layer followed by a 1×3 convolutional layer followed by a 3×1 convolutional layer. The third subnetwork can be configured to combine the third module outputs generated by the plurality of third modules to generate a third subnetwork output for the third subnetwork. The third subnetwork can receive an input that is 8×8×1536 and each third module generates an output that is 8×8×1536.

Another innovative aspect of the subject matter described in this specification can be embodied in a fourth neural network system that is implemented by one or more computer and is configured to receive an image and to generate a classification output for the input image. The fourth neural network system may include: a plurality of subnetworks arranged in a stack on top of each other, wherein each subnetwork is configured to process a subnetwork input to generate a subnetwork output and to provide the subnetwork output as input to another subnetwork above the subnetwork in the stack, and wherein the plurality of subnetworks includes: the first subnetwork, the second subnetwork, and the third subnetwork.

The foregoing and other embodiments can each optionally include one or more of the following features, alone or in combination. The fourth neural network system can further include: a stem subnetwork below the first subnetwork, the second subnetwork and the third subnetwork in the stack, wherein the stem subnetwork is configured to: receive the image; and process the image to generate a stem subnetwork output. The fourth neural network system can further include: a first reduction subnetwork between the first subnetwork and the second subnetwork in the stack. The fourth neural network system can further comprise: a second reduction subnetwork between the second subnetwork and the third subnetwork in the stack.

Another innovative aspect of the subject matter described in this specification can be embodied in a fifth neural network system that is implemented by one or more computers and is configured to receive an image and to generate a classification output for the input image. The neural network system can include: a plurality of subnetworks arranged in a stack on top of each other, wherein each subnetwork is configured to process a subnetwork input to generate a subnetwork output and to provide the subnetwork output as input to another subnetwork above the subnetwork in the stack, and wherein the plurality of subnetworks includes: a first residual subnetwork comprising a plurality of first residual modules, each first residual module comprising: a first submodule comprising: a pass-through convolutional layer configured to process the subnetwork input for the first residual subnetwork to generate a pass-through output, one or more groups of neural network layers, each of the one or more groups of neural network layers being configured to process the subnetwork input for the first residual subnetwork to generate a respective group output, and a filter expansion layer that is configured to generate an expanded output by scaling up the dimensionality of the pass-through output and each of the group outputs; a summing layer configured to generate a summed output from the subnetwork input for the first residual subnetwork and the expanded output; and an activation function layer configured to apply an activation function to the summed output to generate a first residual module output for the first residual module.

The foregoing and other embodiments can each optionally include one or more of the following features, alone or in combination. The pass-through convolutional layer can be a 1×1 convolutional layer. The filter expansion layer can be configured to receive the pass-through output and the group outputs and to apply a 1×1 convolution to the pass-through output and the group outputs to generate the expanded output. The summing layer can be configured to: sum the subnetwork input for the first subnetwork and the expanded output to generate the summed output. The summing layer can be configured to: scale the expanded output to generate a scaled expanded output; and sum the subnetwork input for the first subnetwork and the scaled expanded output to generate the summed output. The activation function can be a rectified linear unit (Relu) activation function. The one or more groups of neural network layers can include a first group that is a stack of multiple convolutional neural network layers. The one or more groups of neural network layers can also include a second group that is a different stack of multiple convolutional neural network layers. The first residual subnetwork can be configured to: combine the first residual module outputs generated by the plurality of first residual modules to generate a first residual subnetwork output for the first residual subnetwork.

Other innovative aspects of the subject matter described in this specification can be embodied in one or more non-transitory storage media encoded with instructions that when implemented by one or more computers cause the one or more computers to implement at least one of the neural network systems described above.

Particular embodiments of the subject matter described in this specification can be implemented so as to realize one or more of the following advantages. By including subnetworks and, in particular, module subnetworks, in a deep neural network, the deep neural network can perform better on image processing tasks, e.g., object recognition or image classification. Additionally, deep neural networks that include module subnetworks can be trained quicker and more efficiently than deep neural networks that do not include module subnetworks while maintaining improved performance on the image processing tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAIL DESCRIPTION

Figure 1:
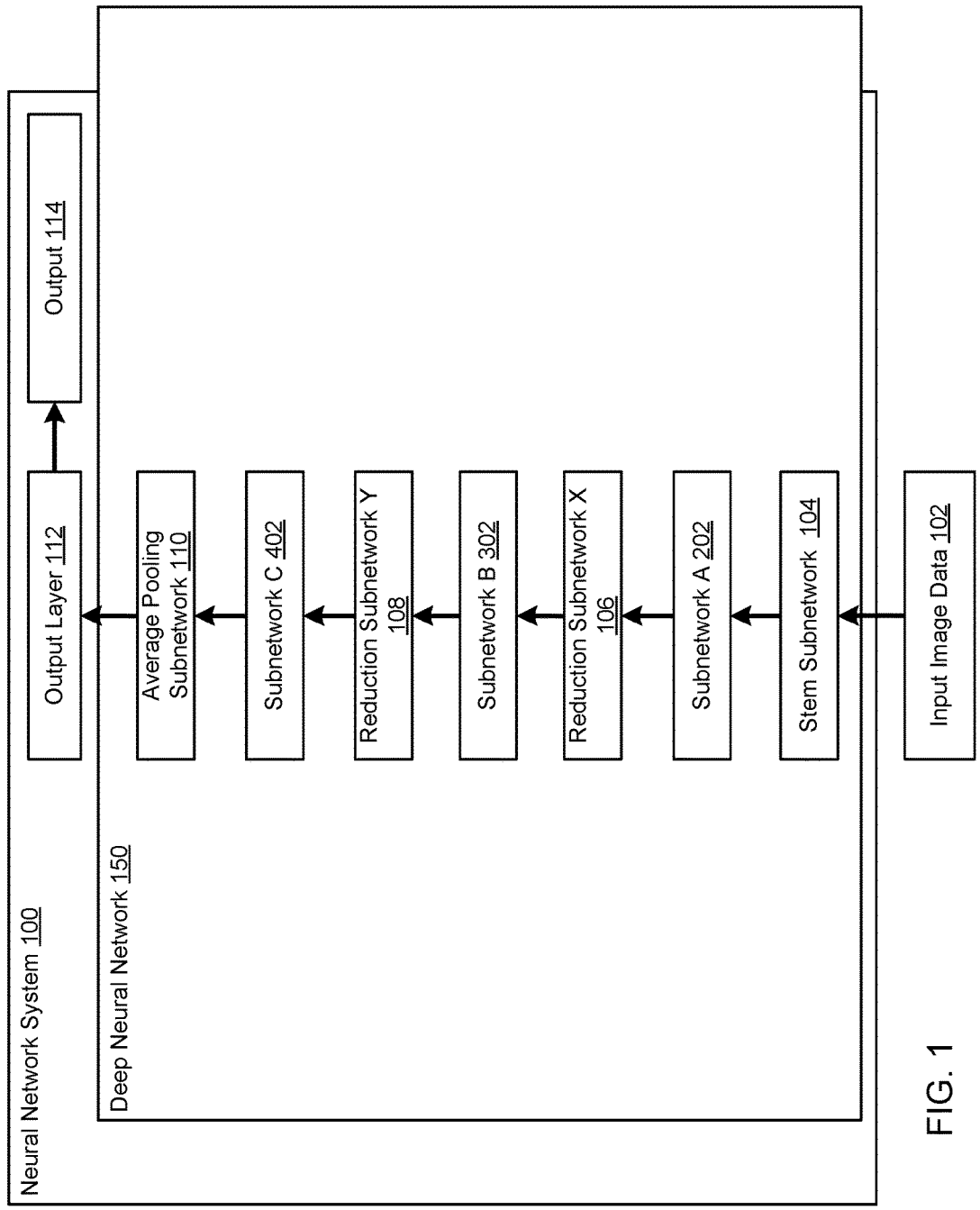
FIG. 1 illustrates an example of a neural network system.

FIG. 1 shows an example neural network system 100. The neural network system 100 is an example of a system implemented as computer programs on one or more computers in one or more locations, in which the systems, components, and techniques described below can be implemented.

The neural network system 100 receives data characterizing an input image, e.g., pixel information for the input image or other information characterizing the input image. For example, the neural network system 100 can receive input image data 102. The neural network system 100 processes the received data using a deep neural network 150 and an output layer 112 to generate an output for the input image, e.g., an output 114 from the input image data 102.

The neural network system 100 can be configured to receive input image data and to generate any kind of score or classification output based on the input image, i.e., can be configured to perform any kind of image processing task. The score or classification output generated by the system depends on the task that the neural network system has been configured to confirm. For example, for an image classification or recognition task, the output generated by the neural network system for a given image may be scores for each of a set of object categories, with each score representing the likelihood that the image contains an image of an object belonging to the category. As another example, for an object detection task, the output generated by the neural network system can identify a location, a size, or both, of an object of interest in the input image.

Generally, the deep neural network 150 includes multiple subnetworks arranged in a stack on top of each other, wherein each subnetwork is configured to process a subnetwork input to generate a subnetwork output. Each subnetwork then provides the subnetwork output as input to another subnetwork above the subnetwork in the stack or, if there are no subnetworks above the subnetwork in the stack, as an output of the deep neural network 150. The output layer 112 then processes the output of the deep neural network 150 to generate an output 114 of the neural network system 100. As described above, the type of output generated by the output layer 112 depends on the image classification task the neural network system 100 has been configured to confirm. Similarly, the type of output layer 112 used to generate the output 114 also depends on the task. In particular, the output layer 112 is an output layer that is appropriate for the task, i.e., that generates the kind of output that is necessary for the image processing task. For example, for the image classification task, the output layer may be a softmax output layer that generates the respective score for each of the set of object categories.

The subnetworks in the deep neural network 150 include multiple module subnetworks and one or more other subnetworks. Each of the other subnetworks consists of one or more conventional neural network layers, e.g., max-pooling layers, average pooling layers, convolutional layers, fully-connected layers, regularization layers, output layers, e.g., softmax output layers or linear regression output layers, and so on.

For example, in some implementations, the deep neural network 150 includes subnetwork A 202, subnetwork B 302, or subnetwork C 402, or a combination thereof. Examples of subnetwork A 202, subnetwork B 302, and subnetwork C 402 are provided in detail below with reference to FIGS. 2-4.

In various implementations, the module subnetworks can also include a stem subnetwork that is the lowest subnetwork in the stack and that is configured to receive the image and to process the image to generate a stem output that is an input for the next higher subnetwork in the stack. For example, as shown in FIG. 1, the stem subnetwork 104 is configured to receive the input image data 102 and process the input image data 102 to generate a stem output that is an input for the subnetwork A 202.

In various implementations, the module subnetworks can also include one or more reduction subnetworks that receive a subnetwork output and process the subnetwork output to reduce the dimensionality of the subnetwork output. For example, FIG. 1 shows a reduction subnetwork X 106 between the subnetwork A 202 and the subnetwork B 302 and a reduction subnetwork Y 108 between the subnetwork B 302 and the subnetwork C 402. The reduction subnetwork X 106 is configured to receive an output of subnetwork A 202 and process the output to reduce the dimensionality of the output. The reduction subnetwork Y 108 is configured to receive an output of subnetwork B 302 and process the output to reduce the dimensionality of the output.

In some implementation, the deep neural network may include an average pooling subnetwork (e.g., average pooling subnetwork 110) that is the highest subnetwork in the stack and that is configured to average pool the output of preceding subnetwork to generate the output of the deep neural network 150.

In some implementations, the module subnetworks include one or more residual subnetworks. A residual subnetwork includes multiple residual modules. Each residual module includes one or more residual submodules. An example of a residual submodule is described in detail below with reference to FIG. 5.

Figure 2:
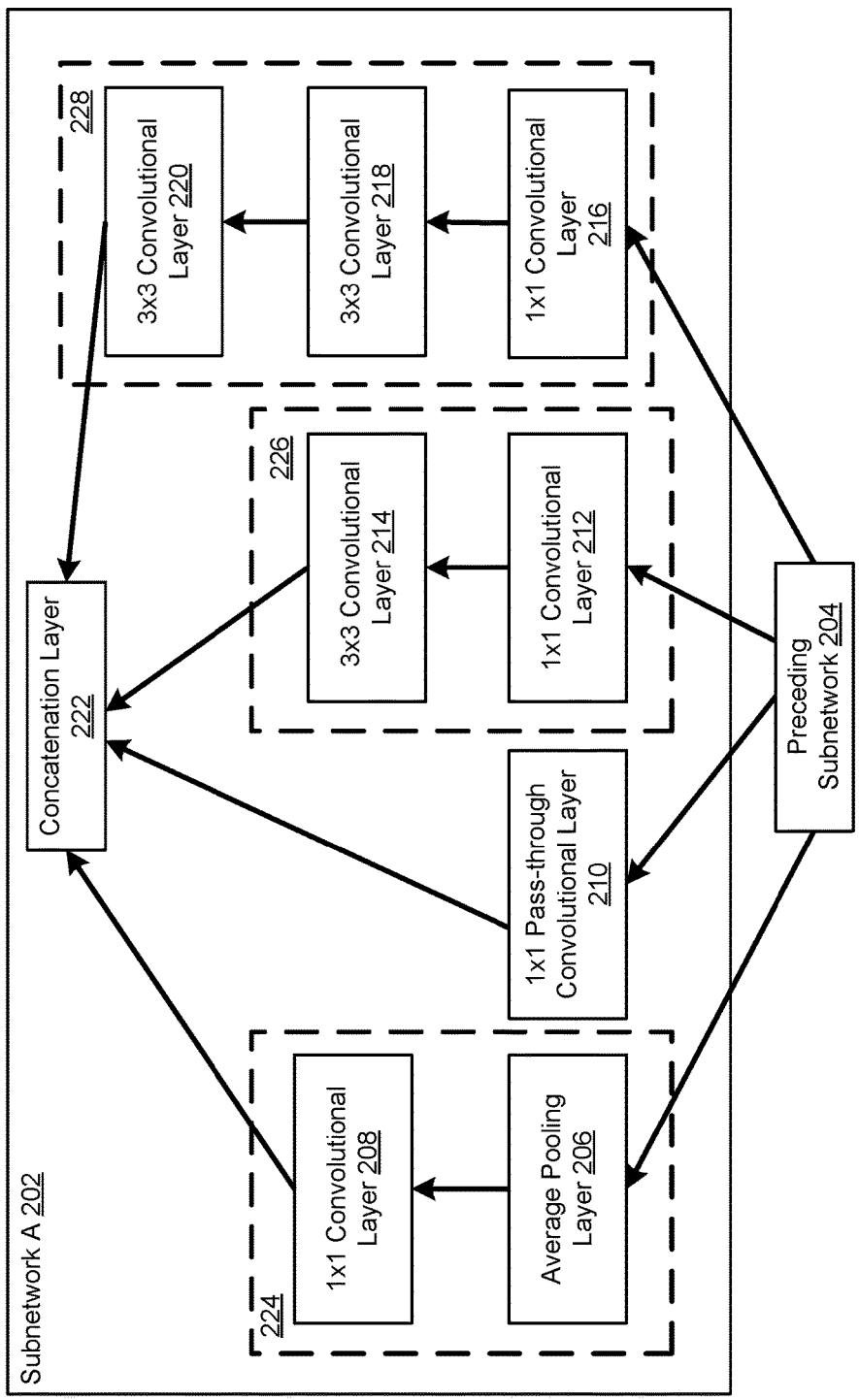
FIG. 2 shows an example of a first subnetwork.

FIG. 2 illustrates an example of subnetwork A 202. Subnetwork A 202 is depicted as a module subnetwork that includes a first module. While only a single module is shown in the example of FIG. 2, the module subnetwork will generally include multiple first modules. For example, the module subnetwork A 202 may include four first modules. As shown in FIG. 2, the first module includes a pass-through convolutional layer, e.g., the pass-through convolutional layer 210; an average pooling stack of neural network layers, e.g., the average pooling stack of neural network layers 224; one or more stacks of neural network layers, e.g., the stack of neural network layers 226 and another stack of neural network layers 118; and a concatenation layer, e.g., the concatenation layer 222. The module subnetwork A 202 receives an input from a preceding subnetwork, e.g., preceding subnetwork 204, and generates an output representation from the received input.

The pass-through convolutional layer is configured to process the subnetwork input of the subnetwork A 202 obtained from preceding subnetwork 204 to generate a pass-through output. In some implementations, the pass-through convolutional layer is a 1×1 convolutional layer. Generally, a k×k convolutional layer is a convolutional layer that uses a k×k filter. That is, k×k represents the size of the patch in the preceding layer that the convolutional layer is connected to. In these implementations, the 1×1 pass-through convolutional layer is generally used as a dimension reduction module to reduce the dimension of the preceding output representation and remove computational bottlenecks that may otherwise limit the size of the deep neural network.

The average pooling stack of neural network layers includes a stack of neural network layers that are configured to collectively process the subnetwork input for the subnetwork A 202 to generate an average pooling output. For example, in the example of FIG. 2, the average pooling stack of neural network layers 224 includes an average pooling layer 206 that average pools the subnetwork input followed by a 1×1 convolutional layer 208.

Each of the one or more stacks of neural network layers in a module subnetwork includes two or more neural network layers, with an initial neural network layer followed by one or more other neural network layers. For example, the subnetwork A 202 includes a first stack 226 that includes a 1×1 convolutional layer 212 followed by a 3×3 convolutional layer 214, and a second stack 228 that includes a 1×1 convolutional layer 216 followed by a 3×3 convolutional layer 218 followed by a 3×3 convolutional layer 220. Other combinations of convolutional layer sizes are possible, however. The layers in the first stack 226 are configured to collectively process the subnetwork input for the subnetwork A 202 to generate a first stack output, and the layers in the second stack 228 are configured to collectively process the subnetwork input for the subnetwork A 202 to generate a second stack output.

The concatenation layer 222 is configured to concatenate the pass-through output, the average pooling output, the first stack output, and the second stack output to generate a first module output for the first module. For example, the concatenation layer 222 is configured to concatenate tensors generated by the pass-through convolutional layer, the average pooling stack of neural network layers, and the stacks of convolutional neural network layers along the depth dimension to generate a single tensor, i.e. the output representation. The output representation of the first module can be used as an input by the next module in the subnetwork A 202. The next module in the subnetwork A 202 can process the input, e.g., the preceding output presentation, in the manner as described in more detail below with reference to FIG. 7.

In some implementations, the subnetwork A 202 can receive an input that is 35×35×384 and each first module can generate an output that is 35×35×384. Other input and output sizes are possible, however.

Figure 3:
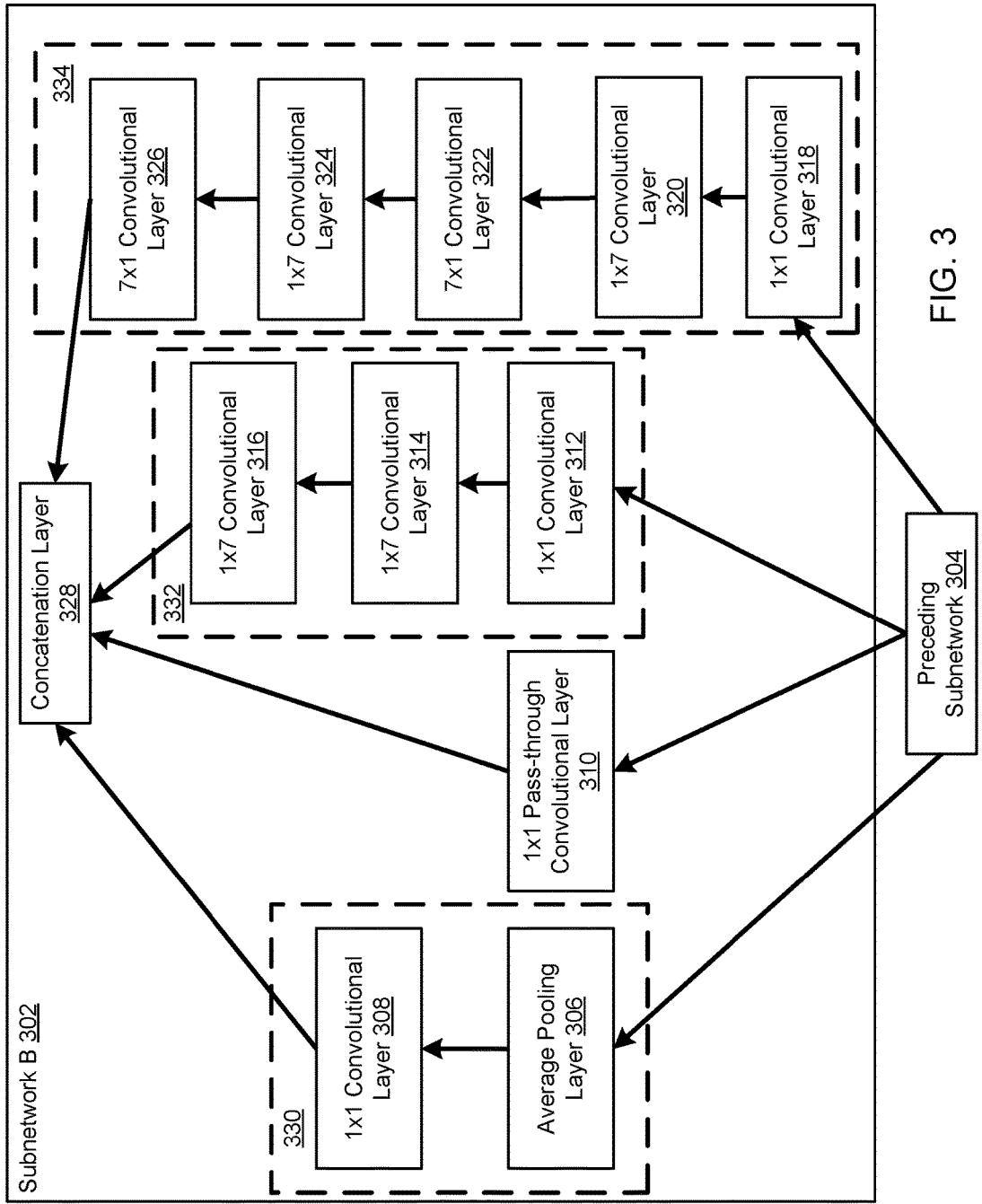
FIG. 3 shows an example of a second subnetwork.

FIG. 3 illustrates an example of subnetwork B 302. Subnetwork B 302 is depicted as a module subnetwork that includes a second module. While FIG. 3 shows only a single module, subnetwork B 302 may include multiple second modules. For example, subnetwork B 302 may include seven second modules. Similar to the first module, the second module includes a pass-through convolutional layer, e.g., the 1×1 pass-through convolutional layer 310; an average pooling stack of neural network layers, e.g., the average pooling stack of neural network layers 330; one or more stacks of neural network layers, e.g., the stack of neural network layer 332, and the stack of neural network layers 334; and a concatenation layer, e.g., the concatenation layer 328. The module subnetwork B 302 receives an input from a preceding subnetwork, e.g., preceding subnetwork 304, and generates an output representation from the received input.

The pass-through convolutional layer 310 is configured to process the subnetwork input of the subnetwork B 302 obtained from preceding subnetwork 304 to generate a pass-through output. The average pooling stack of neural network layers includes a stack of neural network layers that is configured to collectively process the subnetwork input for the subnetwork B 302 to generate an average pooling output. For example, in the example of FIG. 3, the average pooling stack of neural network layers 330 includes an average pooling layer 306 followed by a 1×1 convolutional layer 308.

Each of the one or more stacks of neural network layers in the module subnetwork B 302 includes two or more neural network layers, with an initial neural network layer followed by one or more other neural network layers. For example, the subnetwork B 302 includes a third stack 332 that includes a 1×1 convolutional layer 312 followed by a 1×7 convolutional layer 314 followed by a 1×7 convolutional layer 316, and a fourth stack 334 that includes a 1×1 convolutional layer 318 followed by a 1×7 convolutional layer 320 followed by a 7×1 convolutional layer 322 followed by a 1×7 convolutional layer 324 followed by a 7×1 convolutional layer 326. Other combinations of convolutional layer sizes are possible, however. The layers in the third stack 332 are configured to collectively process the subnetwork input for the subnetwork B 302 to generate a third stack output, and the layers in the fourth stack 334 are configured to collectively process the subnetwork input for the subnetwork B 302 to generate a fourth stack output.

The concatenation layer 328 is configured to concatenate the pass-through output, the average pooling output, the third stack output, and the fourth stack output to generate a second module output for the second module. For example, the concatenation layer 328 is configured to concatenate tensors generated by the pass-through convolutional layer 310, the average pooling stack of neural network layers 330, and the stacks 332 and 334 of convolutional neural network layers along the depth dimension to generate a single tensor, i.e. the output representation of the second module. The output representation of the second module can be used as an input by the next module in the subnetwork B 302. The next module in the subnetwork B 302 can process the input, e.g., the preceding output presentation, in the manner as described in more detail below with reference to FIG. 7.

In some implementations, the subnetwork B 302 can receive an input that is 17×17×1024 and each second module can generate an output that is 17×17×1024. Other input and output sizes are possible, however.

Figure 4:
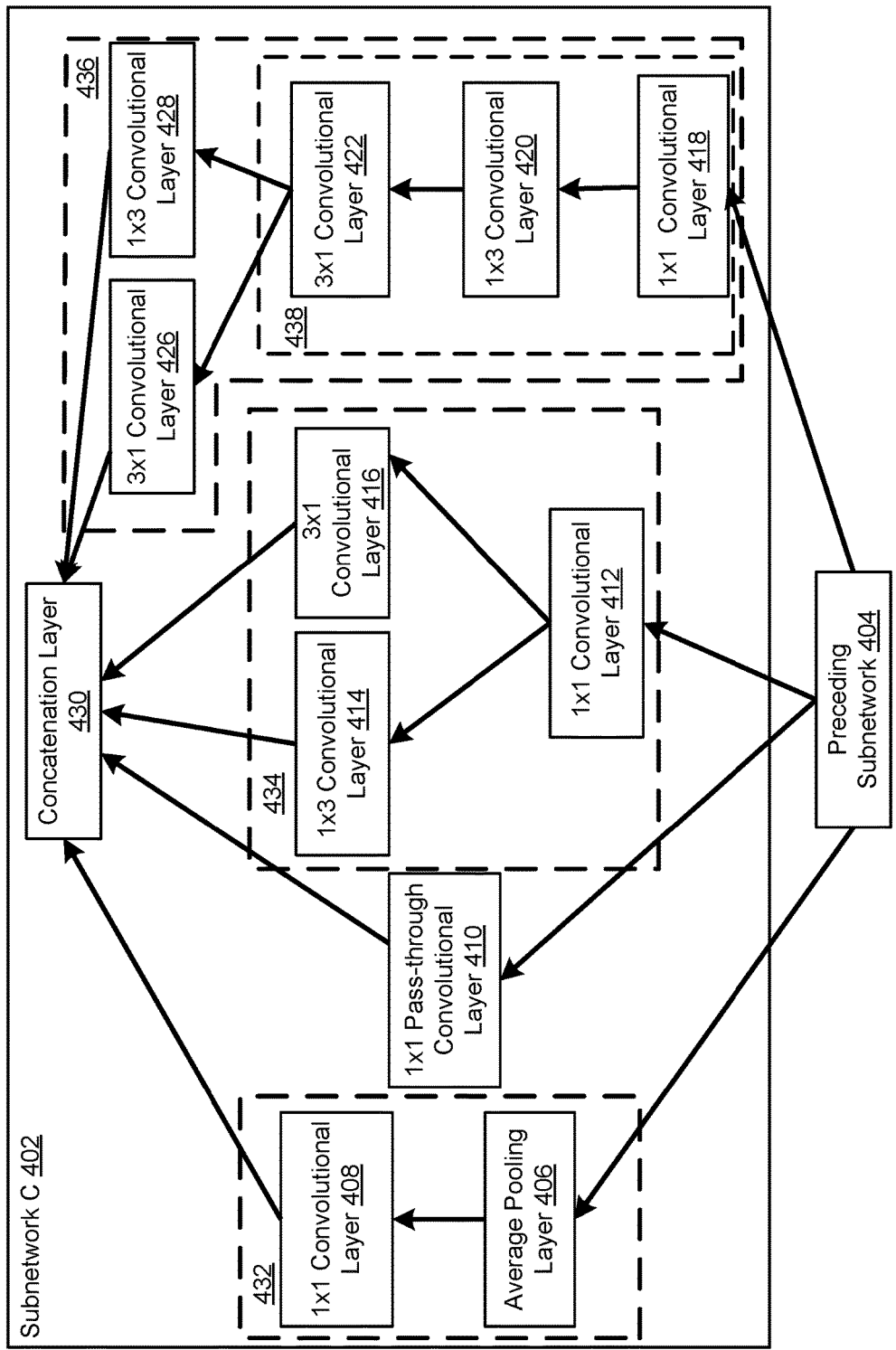
FIG. 4 shows an example of a third subnetwork.

FIG. 4 illustrates an example of subnetwork C 402. Subnetwork C 402 is depicted as a module subnetwork that includes a third module. While FIG. 4 shows only a single module, subnetwork C 402 may include multiple third modules. For example, subnetwork C 402 may include three third modules. The third module includes a pass-through convolutional layer, e.g., the 1×1 pass-through convolutional layer 410; an average pooling stack of neural network layers, e.g., the average pooling stack of neural network layers 432; one or more groups of neural network layers, e.g., the group of neural network layers 434, and another group of neural network layers 436; and a concatenation layer, e.g., the concatenation layer 430. The module subnetwork C 402 receives an input from a preceding subnetwork, e.g., preceding subnetwork 404, and generates an output representation from the received input.

The pass-through convolutional layer is configured to process the subnetwork input of the subnetwork C 402 obtained from preceding subnetwork 404 to generate a pass-through output. The average pooling stack of neural network layers includes a stack of neural network layers that are configured to collectively process the subnetwork input for the subnetwork C 402 to generate an average pooling output. For example, as shown in FIG. 4, the average pooling stack of neural network layers 432 includes an average pooling layer 406 followed by a 1x1 convolutional layer 408.

Each of the one or more groups of neural network layers in the module subnetwork C 402 includes two or more neural network layers, with an initial neural network layer followed by one or more other neural network layers. As an example, as shown in FIG. 4, the subnetwork C 402 includes a first group of neural network layers 434 that includes a 1×1 convolutional layer 412, a 1×3 convolutional layer 414, and a 3×1 convolutional layer 416. Other combinations of convolutional layer sizes a possible, however. The layer 412 is configured to process the subnetwork input for the subnetwork C 402 to generate a first intermediate output. The layer 414 and layer 416 are each configured to process the first intermediate output to generate second and third intermediate outputs respectively. The first group may include a first group concatenation layer (not shown) that is configured to concatenate the second intermediate output and the third intermediate output to generate the first group output.

In another example, the subnetwork C 402 includes a second group of neural network layers 436 that includes a fifth stack of neural network layers 438 that is configured to process the subnetwork input for the subnetwork C 402 to generate a fifth stack output. The second group further includes a 1×3 convolutional layer 428 that is configured to process the fifth stack output to generate a fourth intermediate output and a 3×1 convolutional layer 426 that is configured to process the fifth stack output to generate a fifth intermediate output. Other combinations of convolutional layer sizes are possible, however. The second group 436 may include a second concatenation layer (not shown) that is configured to concatenate the fourth intermediate output and the fifth intermediate output to generate the second group output.

The concatenation layer 430 is configured to concatenate the pass-through output, the average pooling output, the first group output, and the second group output to generate a third module output for the third module. For example, the concatenation layer 430 is configured to concatenate tensors generated by the pass-through convolutional layer 410, the average pooling stack of neural network layers 432, and the groups 434 and 436 of convolutional neural network layers along the depth dimension to generate a single tensor, i.e. the output representation of the second module. The output representation of the third module can be used as an input by the next module in the subnetwork C 402. The next module in the subnetwork C 402 can process the input, e.g., the preceding output presentation, in the manner as described in more detail below with reference to FIG. 7.

In some implementations, the subnetwork C 402 can receive an input that is 8×8×1536 and each third module can generate an output that is 8×8×1536. Other input and output sizes are possible, however.

Figure 5:
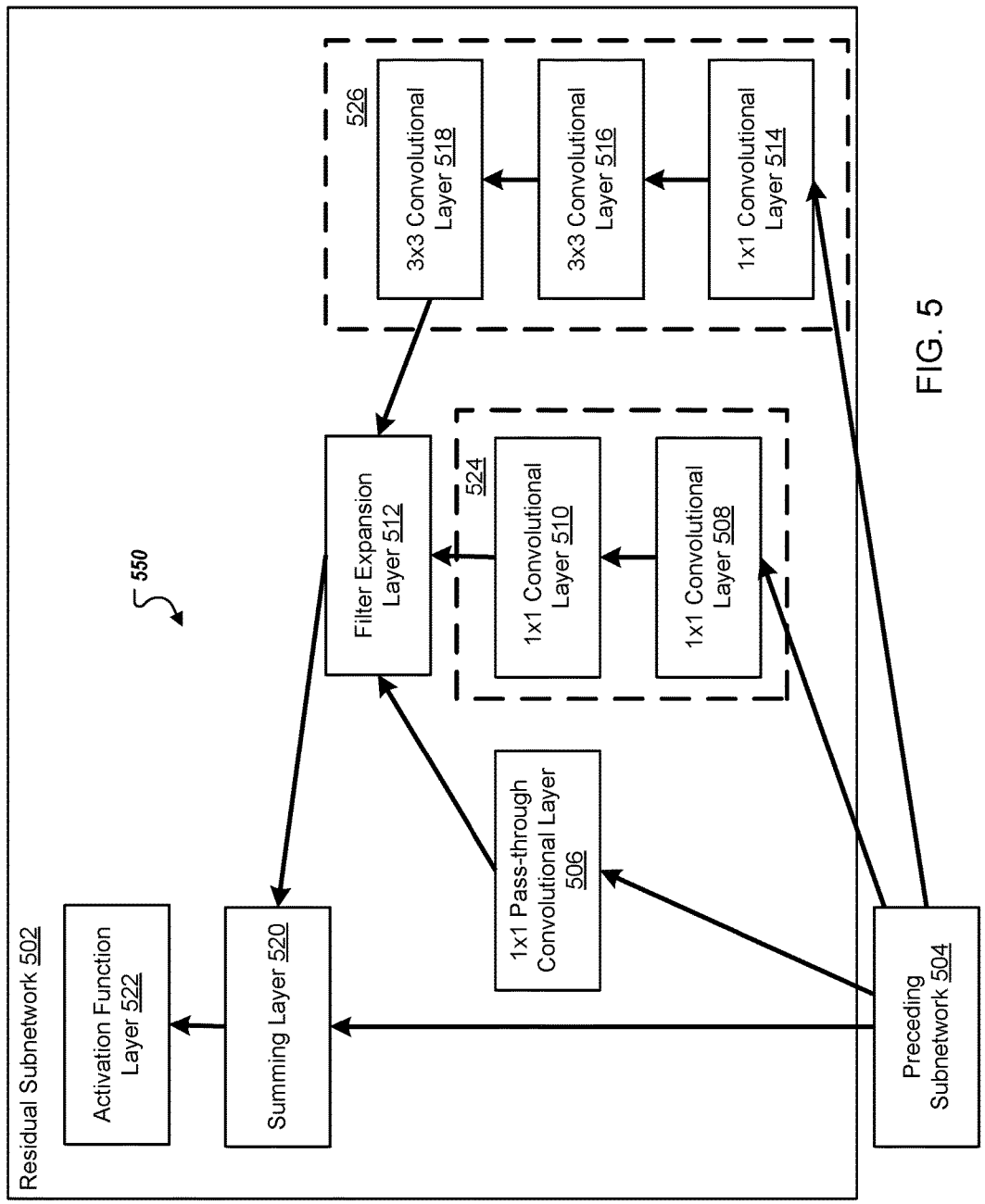
FIG. 5 illustrates an example of a residual subnetwork.

FIG. 5 illustrates an example of a residual submodule 550 of a residual module of a residual subnetwork 502. Although only one residual submodule is depicted, the residual subnetwork 502 can include multiple residual modules and each residual module can include multiple residual submodules. The residual submodule 550 includes a pass-through convolutional layer, e.g., the pass-through convolutional layer 506; one or more groups of neural network layers, e.g., a group of neural network layers 524 and another group of neural network layers 526; a filter expansion layer, e.g., the filter expansion layer 512; a summing layer, e.g., the summing layer 520; and an activation function layer, e.g. the activation function layer 522. The residual submodule 550 receives an input from a preceding subnetwork, e.g., preceding subnetwork 504, and generates an output representation from the received input.

The pass-through convolutional layer is configured to process the subnetwork input for the residual subnetwork 502 to generate a pass-through output. For example, the pass-through convolutional layer 506 is a 1×1 convolutional layer that processes input from previous subnetwork 504 to generate a pass-through output.

Each of the one or more groups of neural network layers is configured to process the subnetwork input for the residual subnetwork to generate a respective group output. In some implementations, the one or more groups of neural network layers include a first group that is a stack of multiple convolutional neural network layers and a second group that is another stack of multiple convolutional neural network layers. For example, the residual submodule 550 includes a stack of neural network layers 524 that includes a 1×1 convolutional layer 508 followed by a 1×1 convolutional layer 510, and another stack 526 that includes a 1×1 convolutional layer 514 followed by a 3×3 convolutional layer 516 followed by a 3×3 convolutional layer 518. Each of these stacks receives the subnetwork input from the previous subnetwork 504 and processes the subnetwork input to generate a respective group output.

The summing layer 520 is configured to generate a summed output from the subnetwork input for the residual subnetwork, the pass-through output, and the group outputs. However, after the subnetwork input (received from the preceding subnetwork 504) is processed by the pass-through convolutional layer 506, the stack of neural network layers 524, and the stack of neural network layers 526, the dimensionality of the pass-through output and the group outputs may not match the dimensionality of the original subnetwork input (e.g., the dimensionality of the subnetwork input may be reduced through these neural network layers).

The filter expansion layer 512 is configured to generate an expanded output by scaling up the dimensionality of the pass-through output and each of the group outputs so that the dimensionality of the expanded output matches the dimensionality of the original subnetwork input. For instance, as shown in FIG. 5, the filter expansion layer 512 is configured to receive the pass-through output from the pass-through convolutional layer 506 and the group outputs and to apply a 1×1 convolution to these outputs to generate an expanded output.

Subsequently, the summing layer 520 can be configured to sum the subnetwork input for the residual subnetwork 502 and the expanded output to generate a summed output.

The activation function layer 522 is configured to apply an activation function to the summed output to generate a residual module output for the residual module. In some implementations, the activation function can be a rectified linear unit (Relu) activation function.

After residual module output are generated by residual modules, the residual subnetwork is configured to combine the residual module outputs to generate a residual subnetwork output for the residual subnetwork.

In implementations where multiple residual subnetworks are included in the neural network system, the groups of neural networks in different ones of the residual subnetworks can have different configurations, e.g., different numbers of groups, different configurations of neural network layers within groups, or both.

Figure 6:
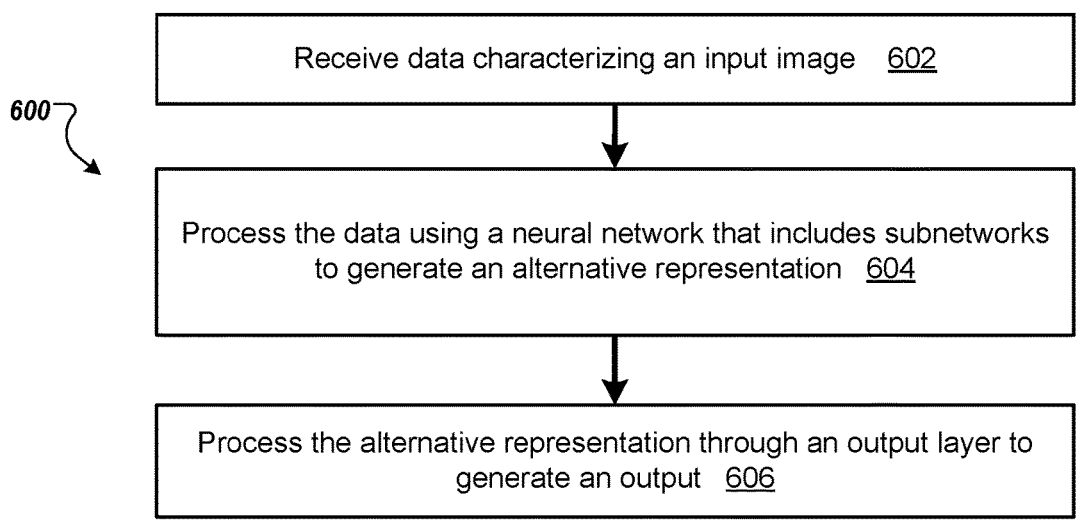
FIG. 6 is a flow diagram of an example process for generating an output from an input image.

FIG. 6 is a flow diagram of an example process 600 for generating an output from a received input. For convenience, the process 600 will be described as being performed by a system of one or more computers located in one or more locations. For example, an image processing system, e.g., the image processing system 100 of FIG. 1, appropriately programmed in accordance with this specification, can perform the process 600.

The system receives data characterizing an input image (step 602).

The system processes the data using a deep neural network that includes subnetworks, e.g., the deep neural network 150 of FIG. 1, to generate an alternative representation (step 604). The deep neural network includes a sequence of subnetworks arranged from a lowest subnetwork in the sequence to a highest subnetwork in the sequence. The system processes the data through each of the subnetworks in the sequence to generate the alternative representation. The subnetworks in the sequence include multiple module subnetworks and, optionally, one or more subnetworks that include one or more conventional neural network layers, e.g., pass-through convolutional layers, average pooling layers, convolutional layers, concatenation layers, and so on. Processing an input through a module subnetwork is described below with reference to FIG. 7.

The system processes the alternative representation through an output layer to generate an output for the input image (step 606). Generally, the output generated by the system depends on the image processing task that the system has been configured to perform. For example, if the system is configured to perform an image classification or recognition task, the output generated by the output layer may be a respective score for each of a predetermined set of object categories, with the score for a given object category representing the likelihood that the input image contains an image of an object that belongs to the object category.

Figure 7:
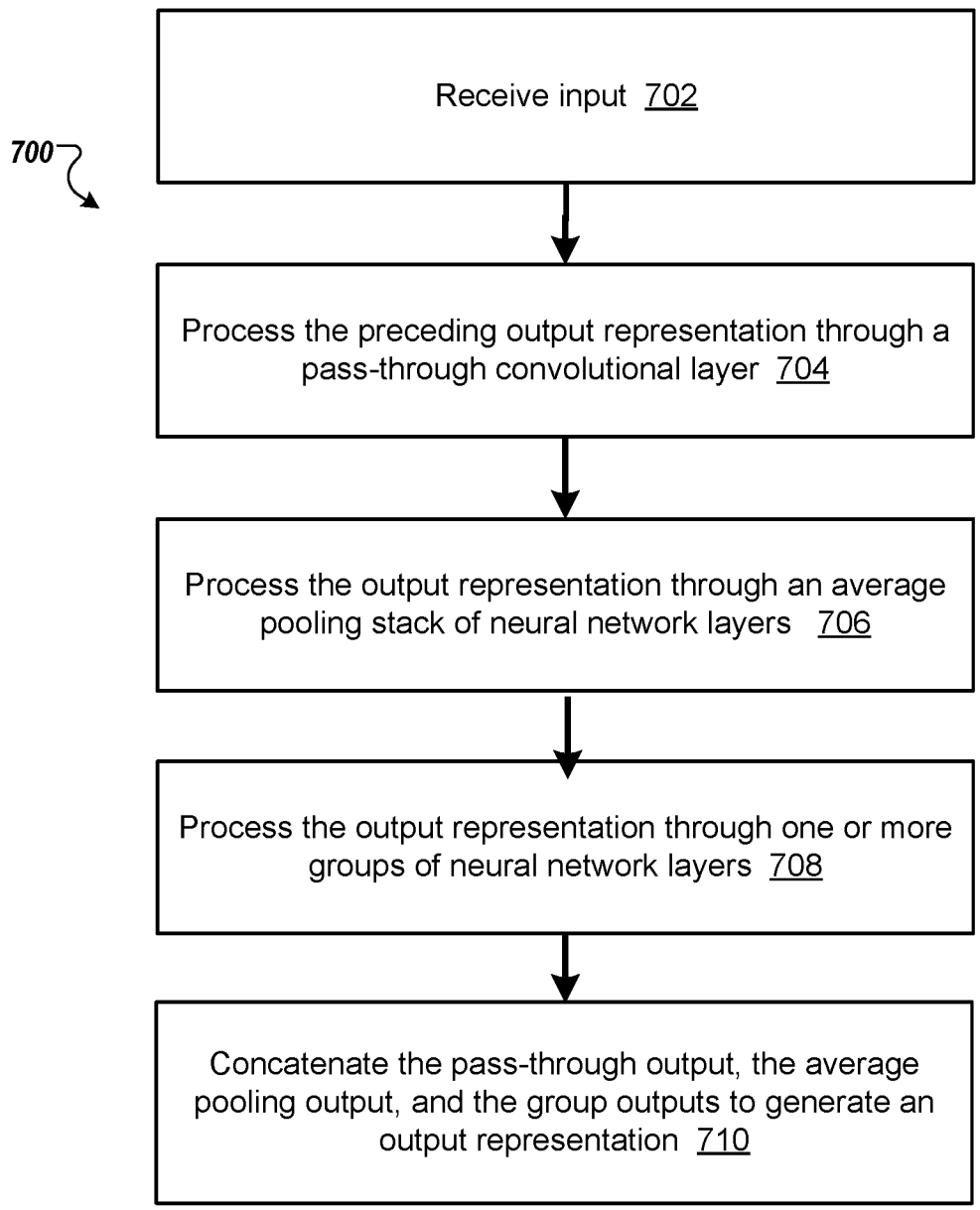
FIG. 7 is a flow diagram of an example process for processing an input using a deep neural network.

FIG. 7 is a flow diagram of an example process 700 for processing an input using a module subnetwork. For convenience, the process 700 will be described as being performed by a system of one or more computers located in one or more locations. For example, the neural network system 100 of FIG. 1, appropriately programmed in accordance with this specification, can perform the process 700.

The system receives an input (step 702). In particular, the input is a preceding output representation, i.e., an output representation generated by a preceding subnetwork in the sequence of subnetworks, or an output representation generated by a preceding module in the sequence of multiple modules of a module subnetwork.

The system processes the preceding output representation through a pass-through convolutional layer to generate a pass-through output (step 704). In some implementations, the pass-through convolutional layer is a 1×1 convolutional layer.

The system processes the preceding output representation through an average pooling stack of neural network layers to generate an average pooling output (step 706). For example, an average pooling stack of neural network layers can include an average pooling layer that average pools the subnetwork input followed by a 1×1 convolutional layer.

The system processes the preceding output representation through one or more groups of neural network layers (step 708). Each group of neural network layers includes an initial neural network layer followed by one or more additional neural network layers. The system processes the preceding output representation through a given group by processing the preceding output representation through each of the neural network layers in the group to generate a group output for the group.

In some implementations, one or more of the groups includes one convolutional layer followed by another convolutional layer. For example, one group may include a 1×1 convolutional layer followed by a 3×3 convolutional layer. As another example, another group may include a 1×1 convolutional layer followed by a 3×3 convolutional layer followed by a 3×3 convolutional layer. As described above, the 1×1 convolutional layers can be used as a dimension reduction module to reduce the dimension of the preceding output representation before it is processed by the other convolutional layer that follows the 1×1 convolutional layer. Other combinations of convolutional layer sizes are possible, however.

The system concatenates the pass-through output, the average pooling output, and the group outputs through a concatenation layer to generate an output representation (step 710). For example, the system can concatenate tensors generated by the pass-through convolutional layer, the average pooling stack of neural network layers, and the groups to generate a single tensor, i.e., the output representation. The system can then provide the output representation as an input to the next module in the sequence of multiple modules of a subnetwork, or to the next subnetwork in the sequence of subnetworks, or to the output layer of the system.

The processes 600 and 700 can be performed to generate classification data for images for which the desired classification, i.e., the output that should be generated by the system for the image, is not known. The processes 600 and 700 can also be performed on documents in a set of training images, i.e., a set of images for which the output that should be predicted by the system is known, in order to train the deep neural network, i.e., to determine trained values for the parameters of the layers in the deep neural network, i.e., of the layers in the module subnetworks and the other subnetworks. In particular, the processes 600 and 700 can be performed repeatedly on images selected from a set of training images as part of a backpropagation training technique that determines trained values for the parameters of the layers of the deep neural network.

In some implementations, during training, the deep neural network is augmented with one or more other training subnetworks that are removed after the deep neural network has been trained. Each other training subnetwork (also referred to as a "side tower") includes one or more conventional neural network layers, e.g., can include one or more of average pooling layers, fully connected layers, dropout layers, and so on, and an output layer that is configured to generate the same classifications as the output layer of the system. Each other training subnetwork is configured to receive the output generated by one of the subnetworks of the deep neural network, i.e., in parallel with the subnetwork that already receives the subnetwork output, and process the subnetwork output to generate a training subnetwork output for the training image. The training subnetwork output is also used to adjust values for the parameters of the layers in the deep neural network as part of the backpropagation training technique. As described above, once the deep neural network has been trained, the training subnetworks are removed.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A neural network system implemented by one or more computers, wherein the neural network system is configured to receive an image and to generate a classification output for the input image, and wherein the neural network system comprises:

a plurality of subnetworks arranged in a stack on top of each other, wherein each subnetwork is configured to process a subnetwork input to generate a subnetwork output and to provide the subnetwork output as input to another subnetwork above the subnetwork in the stack, and wherein the plurality of subnetworks includes:

a first subnetwork comprising a plurality of first modules, each first module comprising:

a first pass-through convolutional layer configured to process the subnetwork input for the first subnetwork to generate a first pass-through output;

a first average pooling stack of neural network layers, wherein the layers in the first average pooling stack are configured to collectively process the subnetwork input for the first subnetwork to generate a first average pooling output;

a first stack of convolutional neural network layers, wherein the layers in the first stack are configured to collectively process the subnetwork input for the first subnetwork to generate a first stack output;

a second stack of convolutional neural network layers, wherein the second stack comprises a 1×1 convolutional layer immediately followed by a 3×3 convolutional layer immediately followed by a 3×3 convolutional layer, and wherein the layers in the second stack are configured to collectively process the subnetwork input for the first subnetwork to generate a second stack output; and a first concatenation layer configured to concatenate the first pass-through output, the first average pooling output, the first stack output, and the second stack output to generate a first module output for the first module; and a second subnetwork comprising second modules, each second module comprising:

a second pass-through convolutional layer configured to process the subnetwork input for the second subnetwork to generate a second pass-through output;

a second average pooling stack of neural network layers, wherein the layers in the second average pooling stack are configured to collectively process the subnetwork input for the second subnetwork to generate a second average pooling output;

a third stack of convolutional neural network layers, wherein the third stack includes a 1×1 convolutional layer followed by a 1×7 convolutional layer followed by a 1×7 convolutional layer, and wherein the layers in the third stack are configured to collectively process the subnetwork input for the second subnetwork to generate a third stack output;

a fourth stack of convolutional neural network layers, wherein the layers in the fourth stack are configured to collectively process the subnetwork input for the second subnetwork to generate a fourth stack output; and a second concatenation layer configured to concatenate the second pass-through output, the second average pooling output, the third stack output, and the fourth stack output to generate a second module output for the second module.

2. The neural network system of claim 1, wherein the first subnetwork includes four first modules.

3. The neural network system of claim 1, wherein the first pass-through convolutional layer is a 1×1 convolutional layer.

4. The neural network system of claim 1, wherein the first average pooling stack includes an average pooling layer followed by a 1×1 convolutional layer.

5. The neural network system of claim 1, wherein the first stack includes a 1×1 convolutional layer followed by a 3×3 convolutional layer.

6. The neural network system of claim 1, wherein the first subnetwork is configured to combine the first module outputs generated by the plurality of first subnetworks to generate a first subnetwork output for the first subnetwork.

7. The neural network system of claim 1, wherein the first subnetwork receives an input that is 35×35×384 and each first module generates an output that is 35×35×384.

8. One or more non-transitory storage media encoded with instructions that when executed by one or more computers cause the one or more computers to implement a neural network system that is configured to receive an image and to generate a classification output for the input image, wherein the neural network system comprises:

a plurality of subnetworks arranged in a stack on top of each other, wherein each subnetwork is configured to process a subnetwork input to generate a subnetwork output and to provide the subnetwork output as input to another subnetwork above the subnetwork in the stack, and wherein the plurality of subnetworks includes:

a first subnetwork comprising a plurality of first modules, each first module comprising:

a first pass-through convolutional layer configured to process the subnetwork input for the first subnetwork to generate a first pass-through output;

a first average pooling stack of neural network layers, wherein the layers in the first average pooling stack are configured to collectively process the subnetwork input for the first subnetwork to generate a first average pooling output;

a first stack of convolutional neural network layers, wherein the layers in the first stack are configured to collectively process the subnetwork input for the first subnetwork to generate a first stack output;

a second stack of convolutional neural network layers, wherein the second stack comprises a 1×1 convolutional layer immediately followed by a 3×3 convolutional layer immediately followed by a 3×3 convolutional layer, and wherein the layers in the second stack are configured to collectively process the subnetwork input for the first subnetwork to generate a second stack output; and a first concatenation layer configured to concatenate the first pass-through output, the first average pooling output, the first stack output, and the second stack output to generate a first module output for the first module; and a second subnetwork comprising second modules, each second module comprising:

a second pass-through convolutional layer configured to process the subnetwork input for the second subnetwork to generate a second pass-through output;

a second average pooling stack of neural network layers, wherein the layers in the second average pooling stack are configured to collectively process the subnetwork input for the second subnetwork to generate a second average pooling output;

a third stack of convolutional neural network layers, wherein the third stack includes a 1×1 convolutional layer followed by a 1×7 convolutional layer followed by a 1×7 convolutional layer, and wherein the layers in the third stack are configured to collectively process the subnetwork input for the second subnetwork to generate a third stack output a fourth stack of convolutional neural network layers, wherein the layers in the fourth stack are configured to collectively process the subnetwork input for the second subnetwork to generate a fourth stack output; and a second concatenation layer configured to concatenate the second pass-through output, the second average pooling output, the third stack output, and the fourth stack output to generate a second module output for the second module.

9. The one or more non-transitory storage media of claim 8, wherein the first subnetwork includes four first modules.

10. The one or more non-transitory storage media of claim 8, wherein the first pass-through convolutional layer is a 1×1 convolutional layer.

11. The one or more non-transitory storage media of claim 8, wherein the first average pooling stack includes an average pooling layer followed by a 1×1 convolutional layer.

12. The one or more non-transitory storage media of claim 8, wherein the first stack includes a 1×1 convolutional layer followed by a 3×3 convolutional layer.

13. The one or more non-transitory storage media of claim 8, wherein the first subnetwork is configured to combine the first module outputs generated by the plurality of first subnetworks to generate a first subnetwork output for the first subnetwork.

14. The one or more non-transitory storage media of claim 8, wherein the first subnetwork receives an input that is 35×35×384 and each first module generates an output that is 35×35×384.

15. A computer-implemented method comprising:

processing an input image using a neural network system to generate a classification output for the input image, wherein the neural network system comprises a plurality of subnetworks arranged in a stack on top of each other, wherein each subnetwork is configured to process a subnetwork input to generate a subnetwork output and to provide the subnetwork output as input to another subnetwork above the subnetwork in the stack, and wherein the plurality of subnetworks includes:

a first subnetwork comprising a plurality of first modules, each first module comprising:
- a first pass-through convolutional layer configured to process the subnetwork input for the first subnetwork to generate a first pass-through output;
- a first average pooling stack of neural network layers, wherein the layers in the first average pooling stack are configured to collectively process the subnetwork input for the first subnetwork to generate a first average pooling output;
- a first stack of convolutional neural network layers, wherein the layers in the first stack are configured to collectively process the subnetwork input for the first subnetwork to generate a first stack output;
- a second stack of convolutional neural network layers, wherein the second stack comprises a 1×1 convolutional layer immediately followed by a 3×3 convolutional layer immediately followed by a 3×3 convolutional layer, and wherein the layers in the second stack are configured to collectively process the subnetwork input for the first subnetwork to generate a second stack output; and
- a first concatenation layer configured to concatenate the first pass-through output, the first average pooling output, the first stack output, and the second stack output to generate a first module output for the first module; and a second subnetwork comprising second modules, each second module comprising:
- a second pass-through convolutional layer configured to process the subnetwork input for the second subnetwork to generate a second pass-through output;
- a second average pooling stack of neural network layers, wherein the layers in the second average pooling stack are configured to collectively process the subnetwork input for the second subnetwork to generate a second average pooling output;
- a third stack of convolutional neural network layers, wherein the third stack includes a 1×1 convolutional layer followed by a 1×7 convolutional layer followed by a 1×7 convolutional layer, and wherein the layers in the third stack are configured to collectively process the subnetwork input for the second subnetwork to generate a third stack output;
- a fourth stack of convolutional neural network layers, wherein the layers in the fourth stack are configured to collectively process the subnetwork input for the second subnetwork to generate a fourth stack output; and
- a second concatenation layer configured to concatenate the second pass-through output, the second average pooling output, the third stack output, and the fourth stack output to generate a second module output for the second module.

* * * * *